April 24, 1945. O. E. SIMMONDS 2,374,241
SELF-LOCKING NUT
Original Filed April 17, 1941
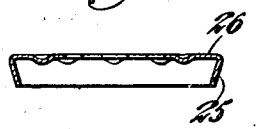
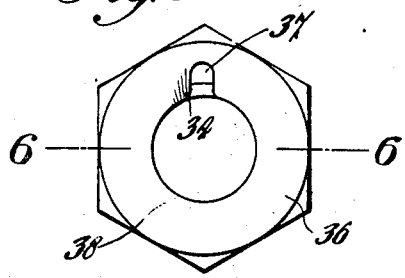
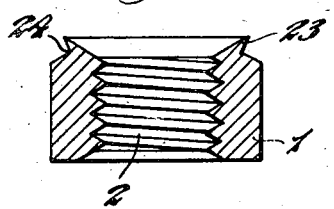
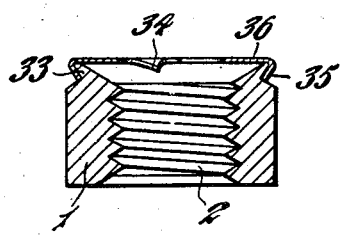
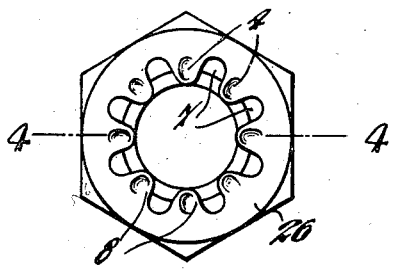
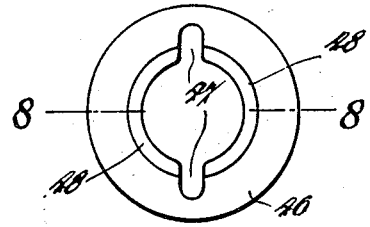
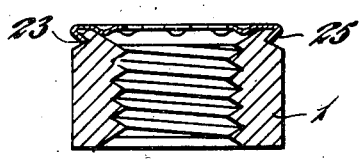
Oliver E. Simmonds
By
Watson, Cole, Grindle & Watson
ATTYS Patented Apr. 24, 1945

2,374,241

UNITED STATES PATENT OFFICE 2,374,241

SELF-LOCKING NUT

Oliver Edwin Simmonds, Ripley, England

Original application April 17, 1941, Serial No. 389,076. Divided and this application January 8, 1942, Serial No. 426,071. In Great Britain April 24, 1940

2 Claims. (Cl. 10—86)

This invention relates to a method of joining two members together and more specifically to a method of assembling cooperating threaded elements and locking means therefor. This application is a division of my prior application Serial No. 389,076, filed April 17, 1941.

An object of the invention is a method of joining two members together by the provision thereon of parts extending therefrom and adapted to cooperate together and to be forced into interlocking engagement by the application of pressure.

Another object of the invention is an improved method of assembling cooperating threaded elements and locking means therefor.

In the manufacture of locking nuts comprising a locking disc or washer, it has been the usual practice to weld the locking disc or washer to one end of the nut body or to house the said disc or washer in a recess at one end of the nut body formed by counterboring the body portion of the nut, and a more specific object of the invention is a simple and satisfactory method of assembling a nut body with a locking washer or disc in which the operations of welling or counterboring are obviated.

The invention will be described with reference to the accompanying drawing, in which like reference numerals denote like parts and in which:

Figure 1 is a vertical sectional view of one form of spring metal disc;

Figure 2 is a central vertical section of one form of nut blank for receiving the spring metal disc shown in Figure 1;

Figure 3 is a top plan view of the completed nut;

Figure 4 is a vertical sectional view taken on the line 4—4 of Figure 3;

Figure 5 is a top plan view of a still further form of nut;

Figure 6 is a vertical sectional view taken on the line 6—6 of Figure 5;

Figure 7 is a plan view of yet another form of spring metal disc, and

Figure 8 is a sectional view taken on the line 8—8 of Figure 7.

In the form of nut illustrated in Figures 1 to 4, the apertured disc 26 has a converging flange 25 of conical formation whilst the nut body 1 has at one end thereof a deformable tubular extension 23 having diverging conical walls and providing a peripheral recess 24. The maximum external diameter of the tubular extension 23 and the minimum internal diameter of the annular flange 25 of the spring metal disc 26 are such that the flange 25 can be placed round the tubular extension 23 of the nut body 1 of Figure 2. In such position, axial pressure is applied to the peripheral portion of the spring metal disc 26 whereby the tubular extension 23 is displaced axially and laterally into the undercut recess provided by the flange 25 of the disc 26 which is thereby held securely to the nut body against removal, as shown in Figure 4.

In the form of lock nut shown in Figures 5 and 6 the inner portion of the apertured disc 36 is in the form of an annulus having a single radially-extending slot 37 forming a single bolt-engaging portion 38 adapted to engage substantially one complete turn of a bolt thread. The whole of the bolt-engaging portion 38 lies in a plane normal to the bolt axis with the exception of a part adjacent the slot 37 which is bent downwardly to form a lip 34 facilitating the initial engagement of the bolt thread with the bolt-engaging portion 38 of the disc. As shown in Figure 6, this form of apertured disc may have a converging conical flange 35 and be secured to the nut body 1 provided with a tubular extension 33 in a manner similar to that described above with reference to Figures 1 to 4. The diameter of the aperture in the disc 36 is preferably the same as or slightly greater or less than the minimum diameter of the threads of the nut body.

The interengaging parts 23 and 25 and 33 and 35 in the forms of nut shown in Figures 4 and 6 respectively normally serve to prevent relative rotary movement between the nut body and the apertured disc, but other or additional means may be provided to prevent such movement.

Figures 7 and 8 illustrate a further form of spring metal disc 46 in which the bolt-engaging portion thereof is in the form of an annulus having an inner diameter equal to or slightly greater or less than the minimum diameter of the threads of the nut body with which the disc is to be used and having two diametrically opposed radially-extending slots 47 forming two substantially similar bolt-engaging portions 48. As shown in Figure 8, this form of disc may have a converging conical flange 45 and be secured to a nut body in a manner similar to that described with reference to Figures 1 to 4.

In all the various forms of spring metal disc, the bolt-engaging part or parts thereof may, if desired, be of V or other suitable shape in section, as illustrated in Figures 7 and 8, so as to mate with the threads of a co-operating bolt. Furthermore, in some cases the inner part of the disc may be dished or domed to increase the resiliency of the bolt-engaging part of the disc, and in the spring metal disc shown in Figures 7 and 8, the inner part of the disc is shown as being dished.

In all forms of nut in accordance with the present invention the apertured disc is made separately from the nut body thus allowing the nut body to be formed from any desired metal, whilst the disc, since the aperture therein is not provided with a screw-thread, may be manufactured most economically, some forms of the disc merely requiring a simple stamping operation for their manufacture.

The term "locking washer" used in the appended claims is intended to include a disc or other member adapted, when assembled with a nut body, to provide a self-locking nut.

I claim:

1. The method of assembling a self-locking nut, comprising providing one end of a nut body with a deformable tubular extension having diverging inner and outer conical surfaces, providing a locking washer having a base portion with a converging annular flange depending from the periphery of said base portion and adapted to be placed over and to surround closely the said deformable extension of the nut body, placing the flange of the locking washer over the said deformable extension and applying axial pressure to upset the said deformable extension into the undercut recess provided by the flange on the locking washer.

2. The method of assembling a disk-like member to the body portion of a nut provided with wrench-engageable surfaces, comprising providing one end of the nut body with a deformable tubular extension having an inner dimension greater than the base diameter of the nut threads and having an undercut outer surface affording a recess, providing the disk-like member with a peripheral converging flange adapted to be placed over and to surround closely the said deformable extension of the nut body, placing the flange of the disk-like member over the said deformable extension and applying generally axial pressure through the disk-like member to the deformable extension to deform the latter outwardly of the nut axis into the flange on the disk-like member.

OLIVER EDWIN SIMMONDS.